R. B. DALY.
ALTAR-BREAD, WAFER OR WAFFLE-BAKERS.
No. 194,894.   Patented Sept. 4, 1877.
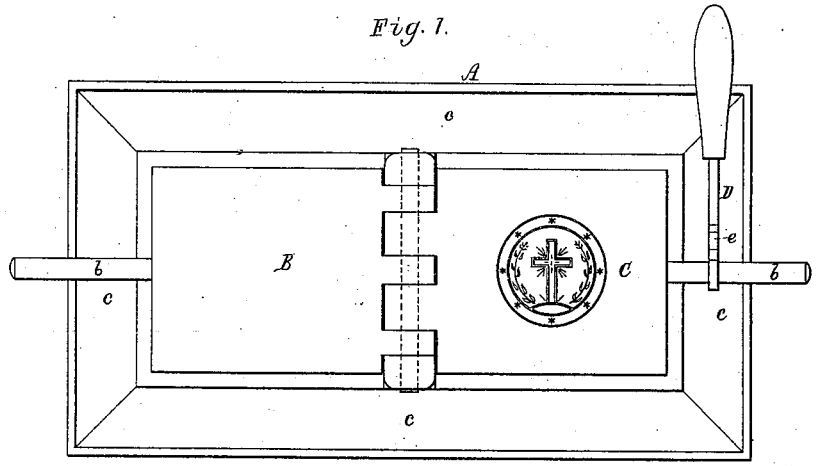
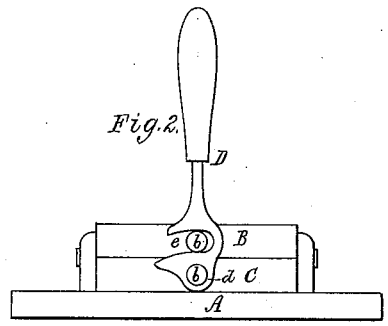
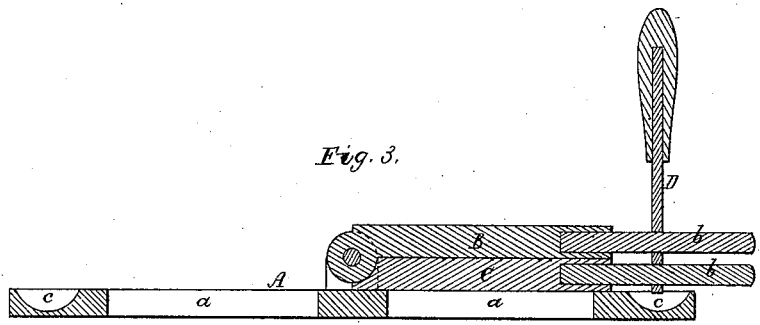
Witnesses
S. W. Piper
[signature]
Inventor
Richard B. Daly,
by his attorney,
R. H. Eddy.

UNITED STATES PATENT OFFICE.

RICHARD B. DALY, OF NEWTON UPPER FALLS, MASSACHUSETTS.

IMPROVEMENT IN ALTAR-BREAD, WAFER, OR WAFFLE BAKERS.

Specification forming part of Letters Patent No. 194,894, dated September 4, 1877; application filed February 20, 1877.

*To all whom it may concern:*

Be it known that I, RICHARD B. DALY, of Newton Upper Falls, of the county of Middlesex and State of Massachusetts, have invented a new and useful Altar-Bread, Wafer, or Waffle Baker; and do hereby declare the same to be described in the following specification and represented in the accompanying drawings, of which—

Figure 1 is a top view of it as open; Fig. 2, an end view of it as closed; and Fig. 3 is a longitudinal section of it.

It is composed of an open metallic frame, A, and two metallic plates, B C, connected thereto at its middle, and so hinged together and to the frame as to be capable not only of being turned either over and upon the other, but into one plane with each other. In this latter case the two plates cover the openings $a\ a$ in the frame or open plate to which they are connected.

Each plate B C I provide with a short cylindrical handle or projection, $b$, to extend from the middle of the free end of the plate. The frame A has in its upper side a channel or trough, $c$, going entirely around it, such being to intercept any waste batter that may be expressed from between the plates while one of them is being forced down upon or toward the other, and upon a charge of batter placed on the lower one.

A clamping lever or tool, D, provided with a round hole, $d$, to receive one of the handles, and also with a curved oblique slot or notch, $e$, to receive the other handle, serves to force either plate toward or away from the other.

Either or each plate on the surface on or against which the batter is to be placed may or should have upon or in it the proper stamp or mold for forming upon or in the wafer the crucial or other illustrations or figures usually found on altar-bread or wafers.

In using the baker it is intended for the open frame A to be placed on a cooking range or stove, and directly over an aperture in the top of the fire-place thereof, the same being in order that heat from the fuel or fire may be absorbed by the baking-plates B C, both of them, while being first heated, being supposed to be turned down upon the plate A.

After the said plates B C may have been sufficiently heated the batter or mixture of wheat flour and water, of which the wafers are usually made, is to be poured in proper quantity on the upper surface of one plate.

This having been accomplished, the other plate is to be quickly turned over and upon the charge of batter, and is to be pressed thereupon by means of the lever D applied to the handles.

A very short period of time will suffice to effect the baking of the wafer, which having taken place, the upper plate should be turned off the wafer and back upon the frame in order to be reheated. Next, such plate should be charged with the batter, after which the other plate should be turned up and over and be forced down upon the charge.

By such a mode of procedure the plates become alternately heated, and the baking of the unleavened bread may be carried on with great dispatch.

I claim—

1. The combination of the open frame A and the two baking-plates B C, provided with the handles or projections $b$, for use as explained.

2. The combination of the open frame A and the two baking-plates B C, arranged and applied as described, and having in or to the frame a trough or channel, $c$, extending around such frame, as set forth.

3. The tool D, provided with the pivot-hole $d$ and the oblique curved slot or notch $e$, arranged in it as set forth, in combination with the altar-bread baker composed of the frame A and the plates B C and their handles $b\ b$, arranged and applied as specified.

4. The altar-bread baker composed of the grooved and open frame A and the two plates B C, provided with the handles or projections $b\ b$, and arranged with and hinged to the frame A, all being as and for the purpose and to operate substantially as specified.

RICHARD B. DALY.

Witnesses:
R. H. EDDY,
S. N. PIPER.